Patented Oct. 19, 1948

2,451,857

UNITED STATES PATENT OFFICE 2,451,857

SEPARATION OF CAPRYL ALCOHOL FROM METHYL HEXYL KETONE BY ALKALI TREATMENT AND DISTILLATION

John J. Miskel, Brooklyn, and Bernard A. Dombrow, New York, N. Y., assignors to Nopco Chemical Company, a corporation of New Jersey No Drawing. Application June 1, 1944, Serial No. 538,334

6 Claims. (Cl. 202—57)

The present invention relates to the purification of crude capryl alcohol. More particularly, the present invention relates to the production of pure capryl alcohol from crude capryl alcohol which contains a considerable percentage of methyl hexyl ketone.

Such mixtures are obtained when castor oil is treated with caustic alkali for the production of sebacic acid. It has ben found extremely difficult to separate the ketone from the alcohol in such a mixture, since the ketone and alcohol have boiling points which are close together. As a result, the crude mixture has been utilized as such or has been treated chemically to produce derivatives of capryl alcohol which may be more easily separated from the ketone, and thereafter the capryl alcohol derivative treated to reform the capryl alcohol. For example, in U. S. Patent No. 2,305,236, capryl alcohol is converted to a secondary octyl borate, the ketone distilled from the borate and the residue hydrolyzed to regenerate the capryl alcohol.

It has now been found, in accordance with the present invention, that if the crude capryl alcohol contaminated with ketone is treated with a condensation catalyst, as, for example, caustic soda or caustic potash, the ketone portion of the mixture may be quantitatively converted to dimeric or trimeric form, whereupon the capryl alcohol may be easily distilled therefrom. This is all the more surprising since it is known that capryl alcohol itself tends to condense in the presence of caustic to produce dicapryl alcohol. For example, Guerbet in Bulletin de la Société Chimique de France (4) 11, 281 (1912), points out that when capryl alcohol is heated with potassium hydroxide, dicapryl alcohol having a higher boiling point is produced.

It has been found, however, that when the crude mixture of capryl alcohol and methyl hexyl ketone in accordance with the present invention is treated with an alkaline condensing agent, substantially no dicapryl alcohol is produced and substantially all of the ketone may be condensed to dimeric and trimeric forms. The capryl alcohol distilled from the ketone is of excellent color and otherwise fulfills all the requirements for a good grade of capryl alcohol.

It is one of the objects of the present invention, therefore, to provide a relatively simple method for purifying crude capryl alcohol.

A second object of the present invention is to provide a method for separating capryl alcohol from hexyl methyl ketone by producing higher boiling compounds from the hexyl methyl ketone.

A third object of the present invention is to separate capryl alcohol by distillation from hexyl methyl ketone by subjecting a mixture of capryl alcohol and hexyl methyl ketone to the action of a suitable condensing agent.

A fourth object of the present invention is to heat a mixture of capryl alcohol and hexyl methyl ketone in the presence of an alkali metal condensing agent so as to produce higher boiling derivatives of the ketone which may be readily separated from the capryl alcohol.

Other objects and advantages of the present invention will be apparent from the present description and claims.

Although it is preferred to utilize caustic soda as a catalyst, as previously pointed out, caustic potash may be used, as well as any of the known alkali metal condensing agents, as, for example, oxides, hydroxides, amides or alkoxides of sodium, lithium, or potassium. In general, the quantity of alkali condensing agent used is less than 10% of the weight of the total mixture and preferably is from 0.2% to 5% of the weight of the mixture. The condensing agent is preferably used in the form of its aqueous solution.

The process is practiced in general by adding to the crude capryl alcohol, the aforementioned quantity of catalyst and heating the same at reflux temperatures until the evolution of water ceases—usually a period of from 2 to 3 hours. It is believed that the polymerization of the ketone will proceed only under substantially anhydrous conditions in the liquid phase of the reaction mixture. Minor amounts of water are often present in the crude capryl alcohol and other minor quantities are customarily introduced in the aqueous solution of the alkaline condensing agent; however it appears that condensation of the ketone is inhibited or prevented until even these small amounts of moisture are driven out of the reaction field as a vapor. During the polymerization of the methyl hexyl ketone additional minor quantities of water of reaction are liberated; of course this water is also quickly evaporated off from the reaction mixture. Since there is no feasible method of determining the exact water content of the mixture when polymerization of the ketone commences, the expression "substantially anhydrous" is employed herein to denote a liquid reaction phase containing a minor amount, say a few per cent, of water as well as one absolutely devoid of water. During the reaction, the evolved water is caught in a water trap, and after the reaction is complete, the capryl alcohol is distilled from the residue which, as before stated, largely consists of dimeric and trimeric forms of methyl hexyl ketone in the proportion of about 50% of dimeric methyl hexyl ketone to 50% of trimeric methyl hexyl ketone.

The present process may also be carried out in a semi-continuous or continuous manner, i. e. a mixture of caustic soda and crude capryl alcohol can be heated until somewhat less than the theoretical amount of water has been evolved and thereafter a portion of the capryl alcohol can be distilled from the reaction mixture. After the distillation of this portion of the capryl alcohol, an additional quantity of crude capryl alcohol is added to the reaction mixture and refluxing resumed until a further quantity of water has been evolved. After the evolution of more water, the reaction mixture can again be distilled and a second batch of purified capryl alcohol removed therefrom. Additional crude capryl alcohol can then be added and the mixture refluxed and again distilled. These steps may be repeated in this manner any number of times, each distillation of capryl alcohol being partial so that only the lower boiling fractions are taken.

The following specific examples serve to illustrate but are not intended to in any way limit the present invention.

*Example I*

To 64.75 pounds of crude capryl alcohol, containing approximately 73% of capryl alcohol, 25.7% methyl hexyl ketone and 1.3% of water, 0.32 pound of 50% sodium hydroxide were added and the mixture refluxed. The evolved water was trapped and separated. When the water evolution had substantially stopped in about 2 to 3 hours, the refluxing was terminated. The reaction material was then distilled under 33 mm. of vacuum. The still temperature was carried up to 130° C. with the vapor temperature at 82° C. 42.5 pounds of capryl alcohol were collected in the first fraction. The collected capryl alcohol was of excellent color, had a refractive index at 25° C. of 1.425, was free from moisture and had a specific gravity at 20° of .819. This yield amounted to approximately 90% of the calculated capryl alcohol in the original batch.

*Example II*

To 80 pounds of crude capryl alcohol, 1.63 pounds of 50% sodium hydroxide were added and the resultant mixture refluxed until 1.06 pounds of water had separated. Thereupon, refluxing was stopped and 25 pounds of capryl alcohol were distilled from the reaction mixture. 27 pounds of additional crude capryl alcohol were added and refluxing was again resumed until one pound of water had separated. Thereupon the refluxing was stopped and 26 pounds of purified capryl alcohol distilled off. After the distillation, 30 additional pounds of crude capryl alcohol were added and the mixture refluxed until .75 of pound of water was again collected and separated. Refluxing was then terminated and 33.5 pounds of purified alcohol distilled from the mixture. The resultant batches of purified capryl alcohol possessed substantially the same properties as that collected in the first fraction of Example I. The combined batches were equivalent to a yield of 84.5% based on the capryl alcohol present in the crude material.

Having described our invention, what we claim as new and desire to be secured by Letters Patent is:

1. A process for separating capryl alcohol from methyl hexyl ketone which comprises heating under substantially anhydrous conditions a mixture of said compounds with a condensing agent of the group consisting of the oxides, hydroxides, alkoxides, and amides of sodium, potassium and lithium to change the ketone to polymeric form, and separating the capryl alcohol from the polymeric ketone.

2. A process for separating capryl alcohol from methyl hexyl ketone which comprises heating under substantially anhydrous conditions a mixture of said compounds with a condensing agent of the group consisting of the oxides, hydroxides, alkoxides, and amides of sodium, potassium and lithium to change the ketone to polymeric form, and distilling off the capryl alcohol from the polymeric ketone.

3. A process for separating capryl alcohol from methyl hexyl ketone which comprises refluxing under substantially anhydrous conditions a mixture of said compounds with a condensing agent of the group consisting of the oxides, hydroxides, alkoxides, and amides of sodium, potassium and lithium to change the ketone to polymeric form while separating and collecting water evolved from the mixture, and separating the capryl alcohol from the polymeric ketone.

4. A process for separating capryl alcohol from methyl hexyl ketone which comprises refluxing under substantially anhydrous conditions a mixture of said compounds with a condensing agent of the group consisting of the oxides, hydroxides, alkoxides and amides of sodium, potassium and lithium, continuing the refluxing operation until the evolution of water substantially ceases, and distilling the capryl alcohol from the polymeric ketone.

5. A process for separating capryl alcohol from methyl hexyl ketone which comprises heating under substantially anhydrous conditions a mixture of said compounds with a condensing agent of the group consisting of the oxides, hydroxides, alkoxides and amides of sodium, potassium and lithium in an amount equal to from 0.2 to 10.0 per cent of the total weight of the mixture to change the ketone to polymeric form, and separating the capryl alcohol from the polymeric ketone.

6. A process for separating capryl alcohol from methyl hexyl ketone which comprises heating under substantially anhydrous conditions a mixture of said compounds with a condensing agent of the group consisting of the oxides, hydroxides, alkoxides and amides of sodium, potassium and lithium in an amount equal to from 0.2 to 10.0 per cent of the total weight of the mixture to change the ketone to polymeric form, and distilling the capryl alcohol from the polymeric ketone.

JOHN J. MISKEL.
BERNARD A. DOMBROW.

REFERENCES CITED

The following references are of record in the file of this patent:

UNITED STATES PATENTS

| Number | Name | Date |
|---|---|---|
| 2,074,528 | Andrews | Mar. 23, 1937 |
| 2,075,205 | Jurist et al. | Mar. 30, 1937 |
| 2,099,475 | Gieser | Nov. 16, 1937 |
| 2,182,056 | Bruson et al. | Dec. 5, 1939 |
| 2,217,515 | Houpt | Oct. 8, 1940 |
| 2,217,516 | Houpt | Oct. 8, 1940 |
| 2,302,346 | Pohler | Nov. 17, 1942 |

OTHER REFERENCES

Adams et al., "Organic Syntheses," vol. 1, pages 61–66, published 1921 by John Wiley & Sons, Inc., New York, New York. (Copy in Div. 6.)

Kao et al., Chemical Abstracts, vol. 8, page 3711 (1934).